Dec. 17, 1968   C. J. LEISTNER ET AL   3,416,895
METHOD OF PURIFYING GRAPHITE
Filed Oct. 12, 1966
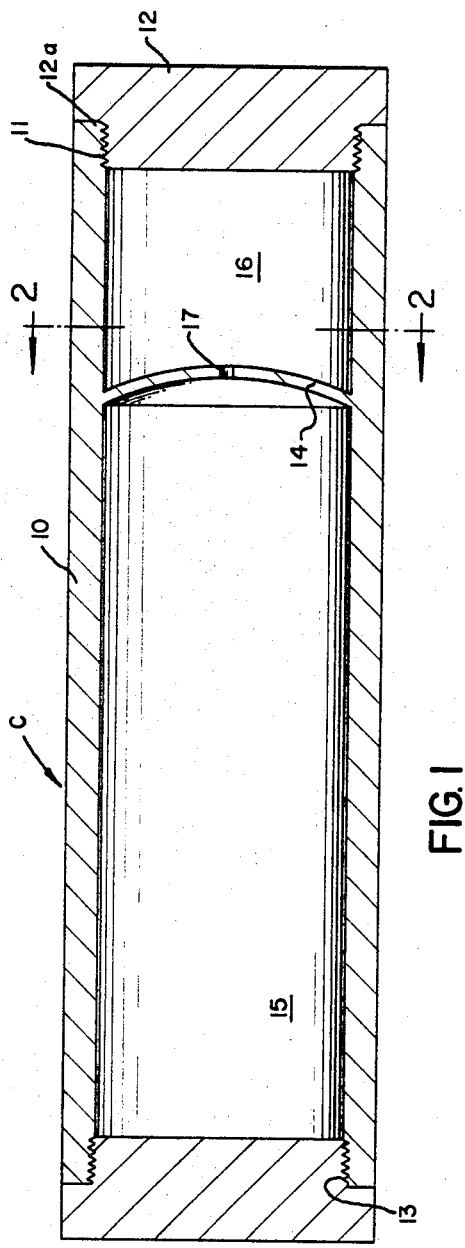
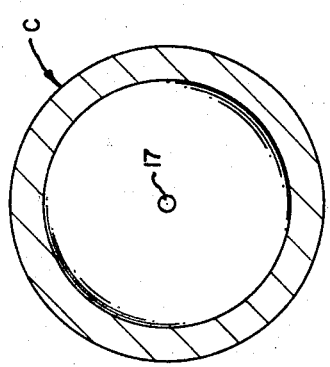
INVENTOR.
CARL J. LEISTNER
BY ALTON W. RADTKE
Learman, Learman & McCulloch
ATTORNEYS

United States Patent Office 3,416,895
Patented Dec. 17, 1968

3,416,895
METHOD OF PURIFYING GRAPHITE
Carl J. Leistner and Alton W. Radtke, Bay City, Mich., assignors to Ultra Carbon Corporation, Bay City, Mich., a corporation of Michigan
Filed Oct. 12, 1966, Ser. No. 586,294
6 Claims. (Cl. 23—209.9)

This invention relates to graphite purification methods and more particularly to processes for producing what may be characterized as a superpure graphite free as far as can be determined of even the traces of metallic impurities which are normally found in spectrographic grade graphite. Whereas prior processes, such as the process described in United States Patent No. 2,734,800, granted Feb. 14, 1956, to Lynn Brooks, and assigned to the assignee of the present invention, have produced high purity graphite parts wherein certain metallic impurities are present only in trace amounts measured in terms of a few parts per million, the present invention is capable of producing parts of such purity that these impurities are not detectable by optical emission spectrographic techniques utilizing, for example, a cathode layer at 15 amps D.C. arc with a 30 second exposure.

For practical purposes, graphite processed in the manner to be disclosed may be considered to be free of the traces of metallic impurities normally found in spectrographic grade graphite, i.e., magnesium, copper, iron, aluminum, silicon and calcium. We have determined that graphite in various shapes and sizes may be successfully purified by our improved methods and utilized in high level spectrographic analysis and as chemical reaction media in situations in which these metallic impurities cannot be tolerated.

One of the prime objects of the present invention is to provide a highly practical, reliable and economical method of obtaining graphite of a high purity we believe never before attained.

Another object of the invention is to provide a method of purifying graphite articles of all sizes and shapes without structurally or otherwise damaging the article in any way.

Briefly, these objects are accomplished by inserting the graphite article to be purified in a closed, highly purified graphite container and immersing it in a particulate packing or mix inside the container comprising proportions of highly pure graphite and reactant powders which, at an elevated temperature, volatilize and sweep out the minute quantities of metal impurities present in the article which are volatilized at this temperature, the gases migrating through and out of the container at the high temperature involved, and the container walls being thick enough to prevent remigration as the container subsequently slowly cools. We have devised a graphite container for use in the process and have determined it to be highly useful in practicing the process.

In the drawings, FIGURE 1 is a sectional, elevational view of the container; and FIGURE 2 is a transverse, cross-sectional view taken on the line 2—2 of FIGURE 1.

A furnace of the character which may be employed in practicing the process is shown in the aforementioned United States Brooks patent, which is incorporated herein by reference, and includes a pure petroleum coke bed into which the purified graphite furnace electrodes extend. For purposes of the present disclosure it may be considered that the process practiced and furnace used are exactly as described in the Brooks patent, the exception being that, instead of immersing the articles to be purified in the furnace coke bed, the articles are placed inside the prepurified graphite container shown in FIGURES 1 and 2 in a special particulate "carrier mix" which will be described and are then immersed in the petroleum coke bed of the furnace.

The "carrier mix," which is packed around the article so as to be in intimate contact with it and fills the container chamber, includes a high proportion of prepurified graphite powder as one of its ingredients, and heating of the furnace container and the parts to be purified is accomplished by the resistance of the petroleum coke bed, the container, the graphite powder in the mix, and the graphite article to be purified, to an electric current applied between the electrodes in the usual manner. When the temperature of the furnace reaches approximately 950° C. in the Brooks process, carbon tetrachloride vapor carried in nitrogen gas is passed into the furnace in the manner disclosed in the Brooks patent through gas supplying porous tubes which are also immersed in the petroleum coke bed during a 2½ hour period during which the charge attained a temperature of 1860° C. Thereafter, in the Brooks process, the introduction of carbon tetrachloride is stopped and difluorodichloromethane ("Freon 12") is introduced to the purified porous graphite tubes and heating is continued for a period of about 6½ hours until the charge temperature reaches approximately 2500° C. At this point the heating is stopped and the "Freon 12" replaced with nitrogen gas while the furnace is allowed to cool. As is known in theart, the nitrogen gas which is used during the cooling period sweeps residual impurities from the coke bed and out a removing apparatus including a hood and duct which continuously exerts a suction in the usual manner.

As shown in FIGURES 1 and 2, the container which we have devised comprises a cylindrical tube 10 having internally provided threads at its ends to receive end caps 12 which are provided with cooperating threads 13. The threads 11 and 13 are extremely well fitted and, along with the abutting surfaces 12a provided on the caps 12, operate to seal the ends of the tube 10. A curvilinear partition wall 14 is provided within the tube 10 to divide it into a reaction chamber 15 and a pressure-relieving chamber 16, wall 14 having an opening 17, as shown. The article or articles to be purified are placed within the chamber 15 and immersed in the particulate "carrier mix" previously mentioned which completely fills the chamber 15, while the chamber 16 simply remains open. While possibly some improved results can be achieved simply through use of a container C, we have determined that much better results in terms of removal of impurities are obtained when what we term a "carrier mix" is employed which includes, in addition to prepurified particulate graphite, a reagent which volatilizes at the high temperatures involved to provide a media for chemically reacting with impurities in the graphite article and also a media for sweeping the new metallo-compounds formed out of the container C and into the petroleum coke bed, where they can be removed by the "Freon 12" gas during the purification period. Thus, a considerable excess of the reagent is provided in the chamber 15 which furnishes not only sufficient vapor to react with the impurities in the article but also sufficient vapor under the pressures created by vaporization to sweep the impurities through the relatively thin (i.e., for most products, ¼ to ½ inch in thickness) and porous wall 10 of the container C.

Various vaporizable, reagent powders, including halogen and alkali salts or compounds, have been determined to be effective as carriers when mixed with an inert, electrically conductive matrix such as graphite powder. The reagents should vaporize within the temperature ranges used to form gases having relatively high expansion coefficients. Certain carriers have been used with some success and include rock salt, sea water salt, ammonium chloride, tetrafluoroethylene, barium fluoride, strontium carbonate, lithium fluoride, germanium oxide, lithium carbonate, and sodium aluminum fluoride or cryolite. The mix used comprising fifty percent by weight of 200-325 mesh graphite powder was utilized with a powder carrier of the same mesh in the proportion fifty percent by weight. Both the container C and the graphite powder used are prepurified by processing them in a furnace in accordance with the aforementioned Brooks patent. The results obtained with fine graphite powder in the "carrier mix" is necessary as opposed, for instance, to coke particles. The graphite powder is used as a diluent and dispersant which slows down vaporization so that it occurs over a greater period of time. It is believed that the various metallic impurities are more susceptible to combining with the "carrier mix" gases formed, due to their close proximity to them in container C.

When rock salt was used as the carrier, there was a complete removal of iron, copper and calcium traces as far as could be determined and only slight traces of magnesium, silicon and aluminum remained. When sea water salt was used, the magnesium, aluminum, iron, copper, and calcium were entirely removed as far as could be determined and only a light trace of silicon remained, and the same thing was true when ammonium chloride was used. When tetrafluoroethylene was used as the carrier, the aluminum, iron, copper and calcium were entirely removed as far as could be determined and only light traces of the magnesium and silicon impurities remained. When strontium carbonate was used as the carrier, only light traces of magnesium and silicon remained and the aluminum, iron, copper and calcium impurities were entirely removed as far as could be determined. When strontium carbonate was used as the carrier, the aluminum, iron, copper and calcium impurities were entirely removed as far as could be determined and only faint traces of the magnesium and silicon impurities remained. With barium chloride used as the carrier, all of the impurities mentioned except the silicon impurity were entirely removed as far as could be determined and only a faint trace of the silicon impurity remained. With lithium chloride used as the carrier, all of the impurities mentioned were removed as far as could be determined except that a slight trace of the magnesium impurity remained. With germanium oxide used as the carrier, all of the impurities mentioned were removed as far as could be determined except that a faint trace of the aluminum impurity remained. One of the best carriers for the impurities mentioned was lithium carbonate, which, when used, removed all of the impurities mentioned as far as could be determined.

When a blend of ammonium chloride or sal ammoniac and sodium aluminum fluoride or cryolite was used, it was found that such a blend not only removed all of the magnesium, aluminum, iron, copper, calcium and silicon traces as far as could be determined but also enhanced the removal of boron impurities. Blend mixes which have been used included a "carrier mix" comprising 50% by weight of 200-325 mesh pure graphite powder used with ammonium chloride and cryolite powder of the same mesh and in the proportions of 25% by weight. Each provided excellent results. Another blend, consisting of 50% by weight of the same mesh graphite powder and 45% by weight of the same mesh ammonium chloride powder mixed with 5% by weight of the same mesh cryolite powder also provided excellent results. The cryolite is responsible for removing both the boron and silicon as tetrachlorides and the sal ammoniac is particularly desirable for reducing the magnesium impurity level. Some pitting of the parts was observed when ammonium chloride was used as the only carrier. Because the interior of the containers remains at a higher temperature than the petroleum coke bed and the interiors are under an interior pressure, there is less tendency for remigration to occur.

Dependent on the results desired, the process used may include the introduction of the carbon tetrachloride vapor and "Freon 12" described in the Brooks patent or may omit the carbon tetrachloride vapor and utilize only the "Freon 12" introduced at 1600° C. and held until the bed reaches a temperature of about 2500° C. and thereafter for a short time as the furnace cools and before the nitrogen gas is introduced. The carrier used is vaporized in the container chamber 15 at the vaporization temperature of the particular carrier being used and the vapor reacts with impurities in the graphite article being purified as noted to form volatiles which are swept through the walls 10 of the container by the vaporization pressures created in chamber 15. While the shape or form of the thin-walled container C is not important, it should be mechanically strong enough so as to be useful for repeated purification cycles and the wall should be sufficiently thick that the container functions as a barrier in the sense of preventing impurities from migrating back into the container during the subsequent cool-down of the purification furnace. The chamber wall must be of such thickness that any reabsorption is only into the chamber wall and does not pass all the way through the wall 10 into the chamber 15 and part. It was found that samples of graphite scraped from the inner diameter of tube 10 had a much higher purity than the samples scraped from the outer diameter and were comparable in purity to the parts which were purified. Further, the container should be of such nature that it may be packed and shipped to its ultimate destination, since one of the concepts involved is the shipment of the super-purified parts to the ultimate consumer, in the container, so that there is no chance of contamination. With the carriers mentioned, a substantially complete vaporization is achieved and there is no contamination of the graphite article being purified by the carrier itself.

We believe that at the high temperatures involved there is a molecular diffusion of the combined impurities through the walls of the hot graphite container C, and that there is mechanical penetration because of the inherent porosity of the graphite container C, which has been expanded under high heat conditions so that the vapor pressures of the combined impurities under high heat equilibrium conditions enable the hot gases to pass through the walls of the graphite container C by mechanical penetration and molecular diffusion. These impurities which migrate through the wall 10 of the container C enter the petroleum coke bed and, of course, are swept away by the "Freon 12" during the purification cycle, and in the initial stages of the cooling cycle. The "Freon 12" gas operates to continuously reduce the impurities concentration in the coke bed outside the containers C and is continuously drawn into the removal duct above the furnace bed. The nitrogen gas utilized flushes away residual traces of the reactant impurities during the remainder of the cooling cycle. The containers C are pulled out of the furnace when it has been cooled down to about 1200° C.

In certain instances it is possible to omit the carbon tetrachloride vapor and "Freon 12" used in the Brooks process and still achieve the desired results. For example, when parts have already been prepurified in the Brooks patent according to the Brooks process, the "carrier mix" will finish the job, so to speak, and remove additional impurities. For instance, it may be desirable to purify an article according to the Brooks process, using either "Freon 12" or both carbon tetrachloride vapor and "Freon 12," thence to machine it, and then to repurify the already purified part, utilizing only the "carrier mix" in the container.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

We claim:

1. A method of purifying graphite comprising: inserting the graphite to be purified in a closed pure graphite container containing a carrier mix, including a particulate pure graphite and a reagent which when heated will vaporize to form a gas capable of uniting with impurities in the graphite to be purified; elevating the container to a temperature sufficient to cause the gas to be formed and the reaction of the impurities with the gas to take place to form impurity compound gases which migrate through the container to the exterior thereof; and cooling the container while removing the concentration of migrated gases outside the container so they do not reenter the interior of the container.

2. The combination defined in claim 1 in which said container is immersed in a high temperature coke bed during a purification period and difluoro-dichloromethane is introduced to the bed during said period to remove the concentration of impurities therefrom.

3. The combination defined in claim 1 in which said reagent is a particulate halogen salt.

4. The combination defined in claim 1 in which said reagent is a particulate alkali salt.

5. The combination defined in claim 2 in which said reagent is a blend including sal ammoniac and cryolite.

6. The combination defined in claim 5 in which said blend and particulate graphite comprising the carrier mix are in the range 200–325 mesh.

References Cited

UNITED STATES PATENTS

| | | | |
|---|---|---|---|
| 2,315,346 | 3/1943 | Musgrave et al. | 23—209.9 X |
| 2,624,698 | 6/1953 | Hickey | 23—209.9 |
| 2,734,800 | 2/1956 | Brooks | 23—209.9 |
| 3,035,901 | 5/1962 | Best | 23—209.9 |
| 3,308,943 | 3/1967 | Davila | 23—209.9 X |

EDWARD J. MEROS, *Primary Examiner.*